(12) United States Patent
Feddes

(10) Patent No.: US 9,833,809 B2
(45) Date of Patent: Dec. 5, 2017

(54) PAINT STORAGE DEVICE WITH REUSABLE APPLICATOR

(71) Applicant: Scott Feddes, Belgrade, MT (US)

(72) Inventor: Scott Feddes, Belgrade, MT (US)

( * ) Notice: Subject to any disclaimer, the term of this patent is extended or adjusted under 35 U.S.C. 154(b) by 0 days.

(21) Appl. No.: 15/189,796

(22) Filed: Jun. 22, 2016

(65) Prior Publication Data

US 2017/0021378 A1 Jan. 26, 2017

Related U.S. Application Data

(60) Provisional application No. 62/183,409, filed on Jun. 23, 2015, provisional application No. 62/269,795, filed on Dec. 18, 2015.

(51) Int. Cl.

| | |
|---|---|
| *B43M 11/06* | (2006.01) |
| *B05C 17/00* | (2006.01) |
| *B65D 35/36* | (2006.01) |
| *B65D 47/42* | (2006.01) |
| *B65D 51/24* | (2006.01) |

(52) U.S. Cl.
CPC ............ *B05C 17/002* (2013.01); *B65D 35/36* (2013.01); *B65D 47/42* (2013.01); *B65D 51/24* (2013.01); *B65D 51/242* (2013.01); *Y02W 30/807* (2015.05)

(58) Field of Classification Search
CPC .... A45D 40/28; B05C 17/002; B05C 17/005; B05C 17/00506; B65D 47/42; B65D 47/44; B65D 37/36
USPC ......................................... 401/183, 186, 266
See application file for complete search history.

(56) References Cited

U.S. PATENT DOCUMENTS

| | | | | |
|---|---|---|---|---|
| 1,890,599 | A | * 12/1932 | Cobello ............... | A45D 34/042 132/74.5 |
| 2,628,746 | A | * 2/1953 | James .................... | B65D 35/38 222/486 |
| 4,183,328 | A | * 1/1980 | Lawrence ............ | A01K 13/003 119/603 |
| 7,563,048 | B2 | 7/2009 | Koptis | |

* cited by examiner

*Primary Examiner* — Jennifer C Chiang
(74) *Attorney, Agent, or Firm* — Jean Kyle

(57) ABSTRACT

A paint storage device stores paint in an flexible container that has an reusable applicator head for applying paint to walls or other surfaces. One port of a cap seals the flexible container to store the paint while another port of the cap allows paint to flow from the flexible container to the applicator.

21 Claims, 2 Drawing Sheets

PAINT STORAGE DEVICE WITH REUSABLE APPLICATOR

CROSS-REFERENCE TO RELATED APPLICATIONS

This application claims the benefits of U.S. Provisional Application No. 62/183,409, filed Jun. 23, 2015, and U.S. Provisional Application No. 62/269,795, filed Dec. 18, 2015 the disclosures of which are hereby incorporated by reference in their entirety including all figures, tables and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Painting is one of the first jobs any novice do-it-yourselfer tackles. Repainting a room to change its decor is fast, easy, and inexpensive. Storing the leftover paint so it is available for touch-ups however can be cumbersome and inconvenient. Often there is only a small amount of paint left from a job and one is stuck storing a gallon can that if stored too long will most likely be covered in a film or dried out completely when needed. Airtight jars and containers are available for storing leftover paint but using these for touch-up requires that one hunt for a roller or clean brush to apply the paint. Wetting a full size brush or roller takes more paint then necessary for the small touch-up job, wasting paint, and clean-up of the full size tools is cumbersome. U.S. Pat. No. 7,563,048 describes a paint dispenser and applicator provided as a paint tester allowing a homeowner to test paint in a patch on the wall before buying an entire gallon. Although the dispenser has a cap to seal the paint for storage, the applicator and cap are in line making a certain seal of the dispenser for long term storage questionable.

There remains a need for a device to store enough paint for anticipated touch-ups that can be sealed tightly insuring long term viable storage, yet provide a means for application of the paint when needed.

All patents, patent applications, provisional patent applications and publications referred to or cited herein, are incorporated by reference in their entirety to the extent they are not inconsistent with the teachings of the specification.

BRIEF SUMMARY OF THE INVENTION

The device of the subject invention includes a squeezable storage container for touch-up paint that also provides a means for applying the stored paint to a wall or a surface when a touch-up is needed. A dual-port cap on the squeezable container seals the container for long term storage or allows paint to flow through the cap to an applicator for applying the paint to a surface. The cap is removably attached to the container at a single point. One port of the dual cap seals the container for storage. Removing that port from the container allows the user to apply the second port to the container. The second port allows paint to flow through the cap onto an applicator. When the job is complete, the container is sealed using the other port of the cap and the applicator can be cleaned and stored on the cap ready for use next time it is needed.

The device of the subject invention can be used in a method of merchandising paint as well. When paint is mixed for a customer, the container of the device of the subject invention can be filled. The customer will have the exact shade of paint used and be assured that the paint will be ready for use when a touch-up is needed since it has been stored in an air-tight container. Touch-up application is easy with the attached applicator. Because the applicator can be cleaned and re-used, the device is available for multiple paint touch-ups.

DETAILED DESCRIPTION OF THE INVENTION

The device of the subject invention has a squeezable storage container capped with a dual-port cover that seals paint in the container for storage or provides paint to an applicator for application to a surface.

Figure 1:
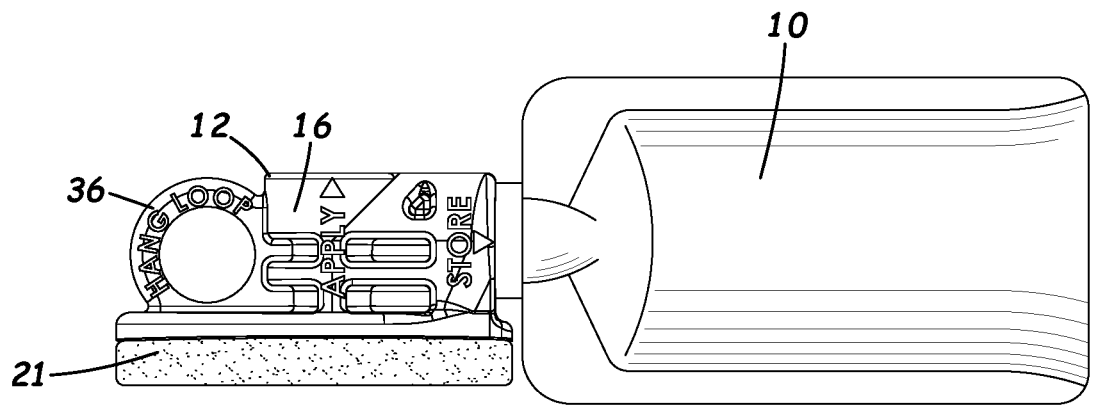
FIG. 1 is a left side elevational view of a preferred embodiment of the device of the subject invention with the cap in the store position.
Figure 2:
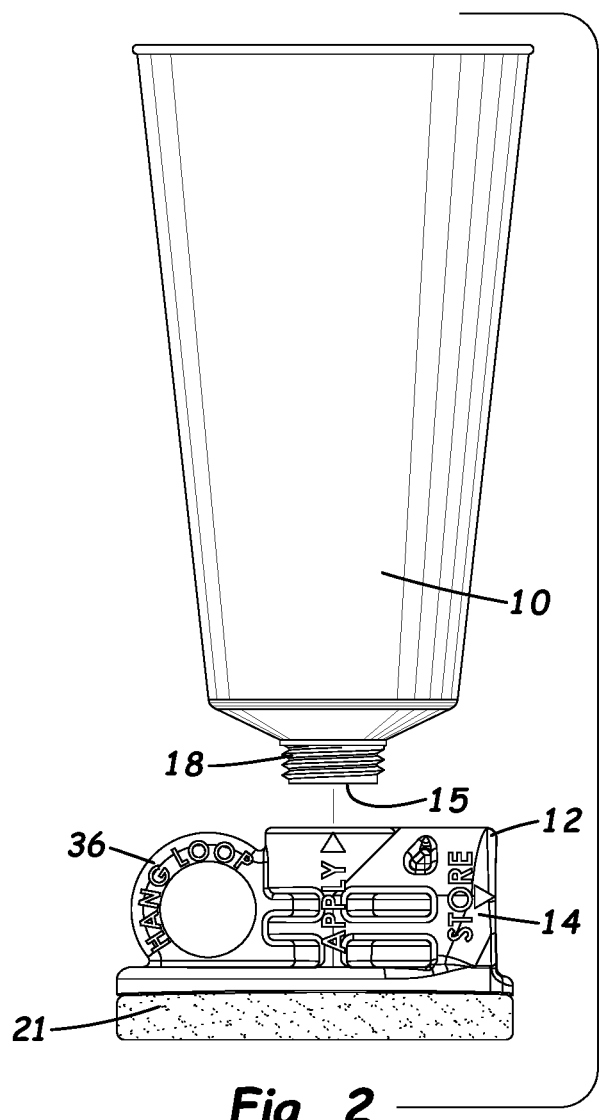
FIG. 2 is an exploded left side elevational view of another preferred embodiment of the device of the subject invention with the cap in the apply position.
Figure 3:
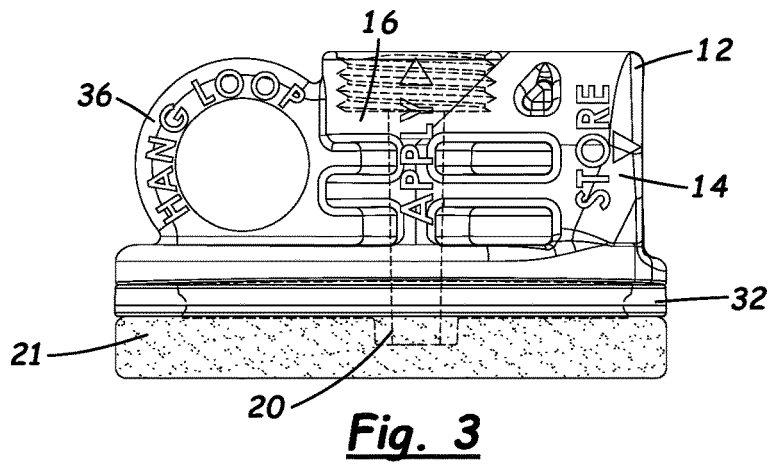
FIG. 3 is a left side elevational view of a preferred embodiment of a cap of the device of the subject invention.
Figure 4:
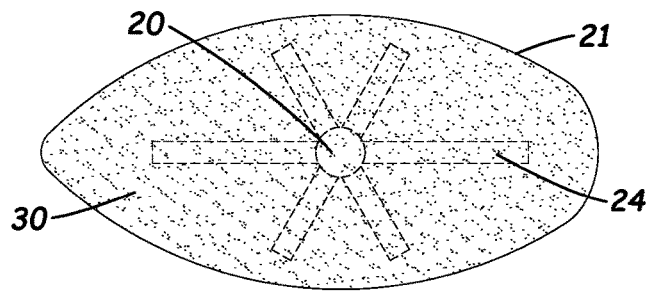
FIG. 4 is a front plan view of a preferred embodiment of a cap of the device of the subject invention.
Figure 5:
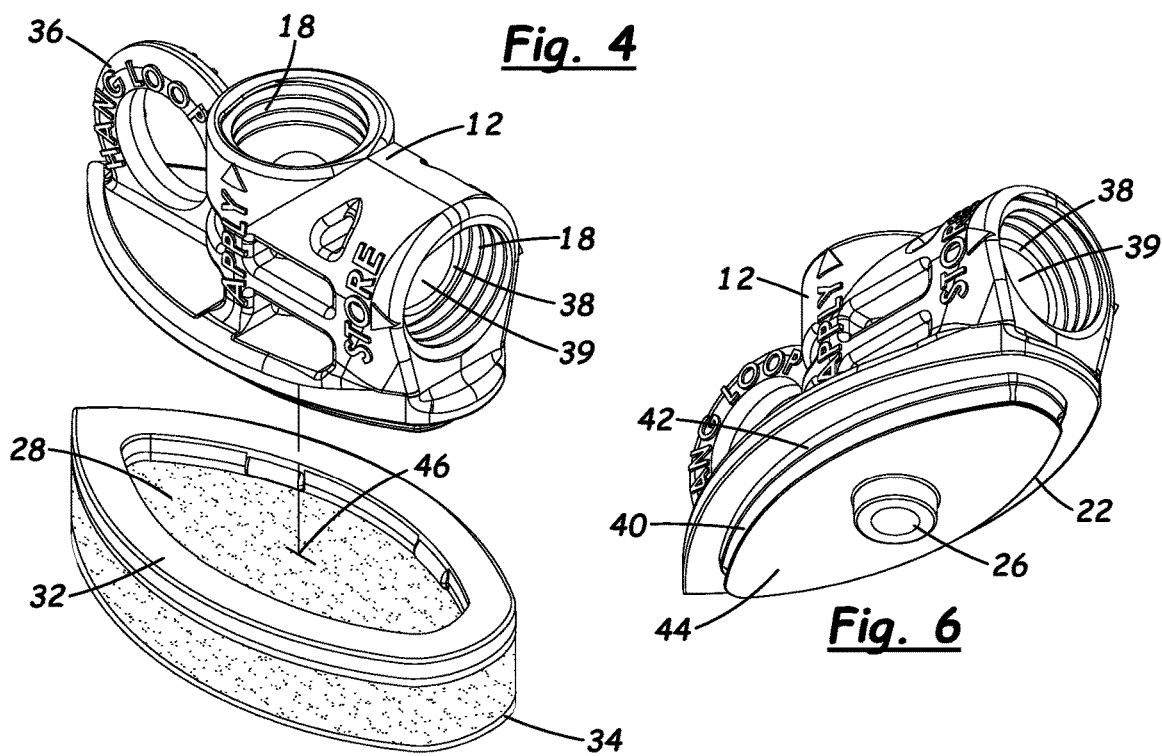
FIG. 5 is an exploded, perspective view of a preferred embodiment of the device of the subject invention.
Figure 6:
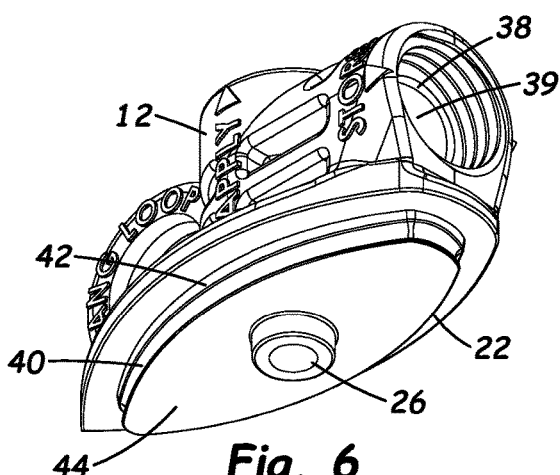
FIG. 6 is a bottom perspective view of a preferred embodiment of a portion of a cap of the device of the subject invention.

The device of the subject invention stores paint in a squeezable container 10. In a preferred embodiment, the container is a flexible pouch or a tube. The squeezable container can be made of a number of materials. It is only required that the materials provide an air-tight container that will not corrode or decay over time or in the presence of the paint chemicals. Further, the material and configuration of the container of the subject invention should be malleable enough to allow paint to be expelled from an orifice in the container with pressure on the container. The container should be able to be kneaded should the user want to mix the paint before use after a long time in storage. The exemplified embodiments show two types of containers suitable for use with the subject invention. FIG. 1 shows a squeezable container that is an aluminum pouch. FIG. 2 shows a squeezable container that is a plastic tube. The containers can be sized to hold any amount of paint. Preferably however they are sized to hold about 2-3 ounces of paint. Containers of this size are easily held and manipulated in the hand of the user.

The cap 12 of the device of the subject invention has two ports. Each port of the cap is configured to engage an orifice 15 of the squeezable container. While it is preferred that the container have a single orifice to reduce the possibility of weakness or failure in the container's integrity, the container can have multiple orifices. In the exemplified embodiment, each port on the cap is configured to engage the same, single orifice of the container.

A first port 14 when connected to an opening or orifice in the squeezable container seals the container from air protecting the paint for storage. A preferred embodiment of this port has a sealing ring 38 on floor 39 of the port to insure a secure closure. The first and second ports of the cap attach to the orifice by releaseable attachment means 18. The releaseable attachment means should provide a secure connection between the container and the cap withstanding changes in the container pressure, heating and cooling of container contents, and pressure applied to the container to expel the paint. In a preferred embodiment the cap ports and container have complimentary, mating threads. Other suitable means to attach the cap to the container include, but are not limited to, a snap grips, and push, turn, and lock systems.

The second port 16 on the cap of the subject invention feeds contents squeezed from the container to an applicator. In a preferred embodiment, a channel 20 feeds the contents through the cap to the applicator 21. The channel 20 directs paint expelled from the container 10 for application to a surface with the applicator 21. The cap can have a tray or pan to allow paint to collect behind the applicator to more evenly spread the paint into the applicator. Alternatively, grooves or pipes 24 can radiate from the channel in the cap to direct the paint across the back of the applicator more evenly distributing the paint on the applicator. The applicator 21 can be, but is not limited to, a brush or a pad. In the exemplified embodiment the applicator is a foam pad. In a preferred embodiment, a seal 26 connects the paint channel to the back 28 of the foam pad so that paint is delivered directly to the face 30 of the foam pad for even application onto the surface.

In a particularly preferred embodiment, the applicator is removable from the cap. Preferably the application can be rinsed, washed, and replaced for additional use with the device of the subject invention. In the exemplified embodiment the foam pad is supported by a frame 32. In this embodiment the frame 32 snaps onto and around an applicator base 22. The base 22 is a raised area in the shape of the frame 32 that supports the applicator pad. The frame snaps into a groove 40 around the base. To promote delivery and distribution of the paint to the foam pad the seal 26 at the end of the channel 20 contacts the back 28 of the pad. A slit 46 in the pad above the channel 20 further encourages the paint to reach the face of the applicator. To prevent the paint expelled from the container from escaping the applicator, a skirt 42 on the groove 40 distal a plateau 44 of the base 22 seals the paint in the applicator pad and frame. It would be apparent to those skilled in the art that there are a number of ways to configure the applicator for removal from the cap. The described configuration is convenient for a cap that uses a channel to deliver paint to the applicator. Being able to remove the applicator allows the channel to be thoroughly rinsed and cleaned of paint. Removal of the applicator may not be necessary however, for example, if the cap was configured so the orifice contacted the applicator through seal 26 or contacted the applicator directly. Further, it is noted the applicator could also be made to be replaced after each use.

To improve application of the paint housed in the container of the subject invention, cloth 34 is placed over the application surface of the foam pad. The cloth covers the texture of the foam making the applicator smoother, more durable, and stronger. The type and thickness of the fabric placed over the foam applicator can vary depending upon the texture of the surface being touched-up and the type of effect desired from the paint.

The cap of the subject invention has at least two ports. One of those ports seals the associated container to store the paint. Other ports can supply and support an applicator. While two ports are shown in the exemplified embodiment, the cap can support two or more ports in multiple configurations. Multiple ports could supply different applicators to address different touch-up issues. The two ports configured as shown in the exemplified embodiment however allow the device to be more easily stored and manipulated. The cap can also contain a loop 36 so that, if desired, the device of the subject invention can be stored hung from a hook.

The paint touch-up tool of the subject invention is preferably filled with paint at or near the time of original purchase of the paint. The tool can be filled by the paint store with a syringe or funnel. Alternatively, a syringe or funnel provided in a kit containing the touch-up tool or provided by the purchaser can be used to fill the device shortly after painting begins. As much air as possible should be dispelled from the filled container before the container is capped with the first port sealing the container for storage. When touch-up is needed, the container can be kneaded to mix the paint within. The first port of the cap is removed and is replaced by the second cap which when pressure is applied to the container allows paint to flow to the applicator. Touch-up can be completed and second port of the cap is removed and replaced with the first port sealing the container. The applicator is removed, washed, and replaced on the cap. The tool can be hung by the loop and stored until the next time touch-up is needed.

The device of the subject invention allows a homeowner to safely store an amount of paint matching their wall color for eventual touch-ups. The paint is capped and stored in an air-tight container until needed. An applicator built into the cap allows for fast and easy application and touch-up with little clean-up. While the subject device has been described primarily as a means of paint storage and application, it is noted that the device can be used to store and apply other fluids or pastes. The squeezable container for such embodiments must be capable of effectively containing and storing the desired contents. Additionally, one skilled in the art would understand any modifications that must be made to the first port to insure secure, viable storage of the contents. Finally, the applicator of the subject devices would be in any form necessary to effectively distribute the contents of the squeezable container.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:
1. A tool comprising:
 a container having at least one orifice, the container configured to be capable of expelling its contents through the at least one orifice when pressure is applied to the container; and
 a cap, the cap having at least a first port and at least a second port, the first port configured to seal the at least one orifice, the second port configured to deliver contents expelled from the container to an applicator;

wherein contents of the container are stored in the container when the first port is applied to the at least one orifice, and contents of the container are delivered to the applicator when the second port is applied to the at least one orifice and pressure is applied to the container.

2. The tool of claim 1, wherein said applicator is configured to apply the contents expelled from the container to a surface.

3. The tool of claim 1, wherein said container is a pouch.

4. The tool of claim 1, wherein said container is a tube.

5. The tool of claim 1, wherein releaseable attachment means connect said at least one orifice to said first port and, separately connect said at least one orifice to said second port.

6. The tool of claim 5, wherein said attachment means are mating threads on said at least one orifice, said first port, and said second port.

7. The tool of claim 5, wherein said attachment means provides an air-tight seal when said orifice is connected to said first port.

8. The tool of claim 1, wherein said second port comprises a channel to deliver the contents expelled from the container to the applicator.

9. The tool of claim 1, wherein said applicator is removable.

10. The tool of claim 1, wherein said applicator is selected from the group consisting of a brush and a pad.

11. The tool of claim 1, wherein said applicator is a foam pad.

12. The tool of claim 1, wherein said second port comprises a channel to deliver the contents expelled from the container to said applicator.

13. The tool of claim 12, further comprising a seal at an end of the channel adjacent said applicator.

14. The tool of claim 12, further comprising grooves radiating from an end of the channel adjacent said applicator to dispense the contents expelled from the container onto said applicator.

15. The tool of claim 1, wherein said cap further comprises a loop.

16. A tool comprising:
a container having at least one orifice, the container configured to be capable of expelling its contents through the at least one orifice when pressure is applied to the container; and
a cap, the cap having at least a first port and at least a second port;
releaseable attachment means to connect the first port to the at least one orifice and, separately to connect the second port to the at least one orifice; and
an applicator;
wherein the first port is configured to seal the at least one orifice, and the second port comprises a channel to deliver contents expelled from the container to the applicator, the applicator configured to apply the contents expelled from the container to a surface.

17. The tool of claim 16, wherein said container is selected from the group consisting of a pouch and a tube.

18. The tool of claim 16, wherein said attachment means are mating threads on said at least one orifice, said first port, and said second port.

19. The tool of claim 16, wherein said applicator is removable.

20. The tool of claim 16, wherein said applicator is a foam pad and an end of said channel adjacent the foam pad having a seal contacting the foam pad.

21. A tool comprising:
a container having at least one orifice, the container configured to be capable of expelling its contents through the at least one orifice when pressure is applied to the container; and
a cap, the cap having at least a first port and at least a second port;
releaseable attachment means to connect the first port to the at least one orifice and, separately to connect the second port to the at least one orifice; and
an applicator, the applicator supported by a frame, the frame engaging a base on the cap by snapping into a groove in the base, the groove comprising a skirt distal a plateau of the base; wherein the first port is configured to seal the at least one orifice, and the second port comprises a channel to deliver contents expelled from the container to the applicator, the applicator configured to apply the contents expelled from the container to a surface.

* * * * *